July 5, 1960
E. B. MORRIS
2,943,876
METAL MENDING SLEEVE WITH RATCHET STRAP
Filed May 20, 1959
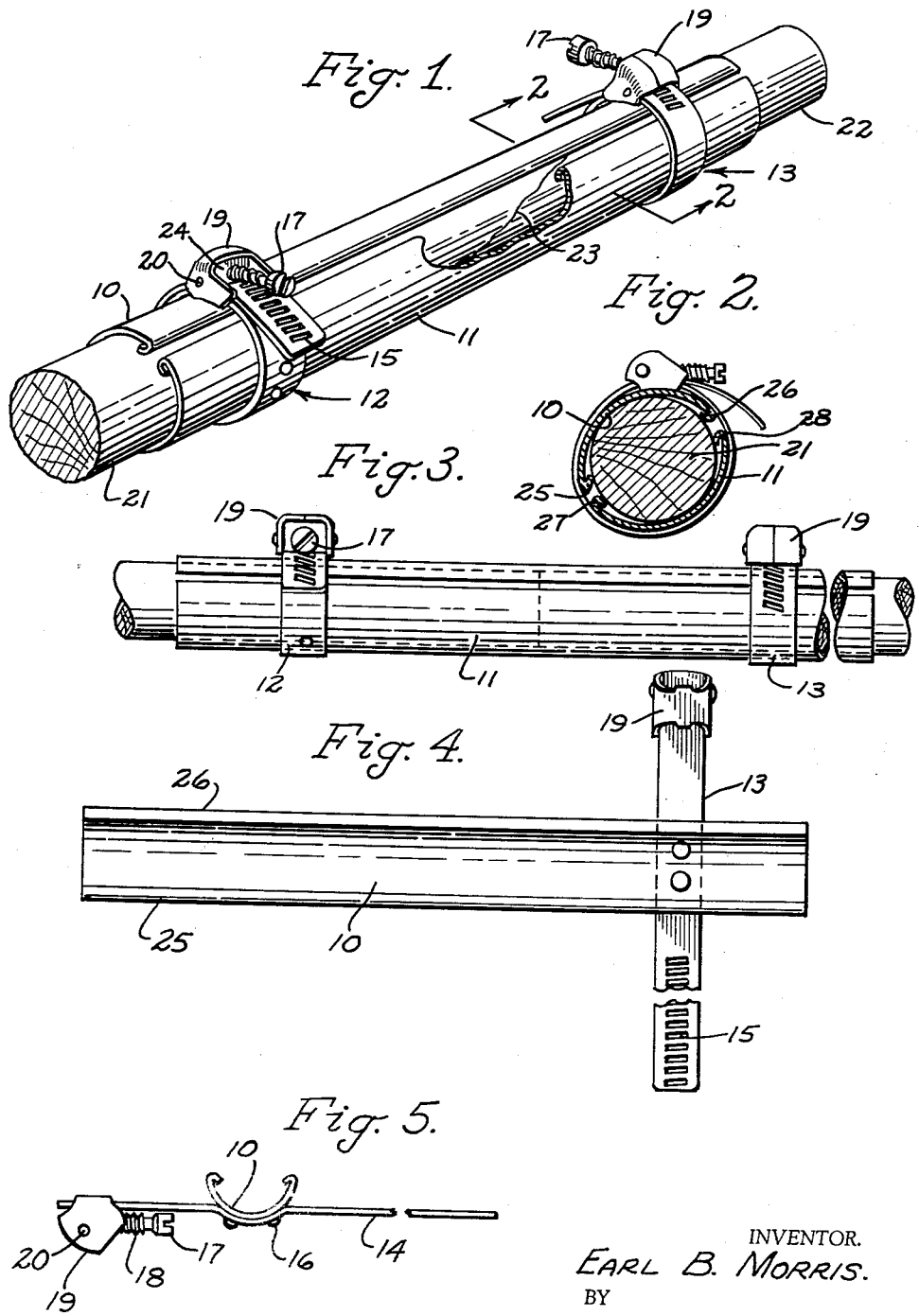
INVENTOR.
EARL B. MORRIS.
BY

United States Patent Office 2,943,876
Patented July 5, 1960

2,943,876
METAL MENDING SLEEVE WITH RATCHET STRAP

Earl B. Morris, 409 W. Monroe, Mexico, Mo.

Filed May 20, 1959, Ser. No. 814,561

1 Claim. (Cl. 287—118)

This invention relates to clamps for repairing broken handles or for adding extensions to handles, and in particular, a pair of substantially semi-circular sleeves of sufficient length to be positioned over a break in a handle or joined in an extension, and a pair of screw clamps with one clamp spaced inwardly from each of the ends of the sleeves and in which threads of screws of the clamps are in the form of worms and wherein the worms mesh with slots in the form of teeth or gear racks whereby upon rotation of the screws oppositely disposed sections of the metal sleeve are rigidly clamped to sections of a handle or the like on opposite sides of a break or splice.

The purpose of this invention is to provide a clamp that may be installed by the average housewife over a break in a handle or over a splice for clamping parts of the handle together or for securing an extension to an end of a handle.

Various types of devices have been provided for connecting parts of a broken handle, or the like, and for securing an extension to the end of the handle, however where screws or other attaching elements are used for connecting the parts and sections of a handle are weakened and sometimes split so that it is very difficult to connect the sections of a broken handle in such a manner that the handle has the same strength as before the break. With this thought in mind this invention contemplates a split metal sleeve of sufficient length to extend over a break in a handle and a screw clamp spaced inwardly from each end of the sleeve whereby two substantially semi-circular sections of a sleeve are rigidly secured over the break of a handle or splice, adding rigidity and giving the handle substantially the same strength as a new handle.

The object of this invention is, therefore, to provide a combination sleeve and clamp for clamping sections of a broken handle together.

Another object of the invention is to provide a clamp for rigidly holding sections of a broken handle or splice together so that the handle may be used in the conventional manner.

A further object of the invention is to provide a connector for clamping sections of a broken handle or splice together in which the connector is of a simple and economical construction.

With these and other objects and advantages in view the invention embodies a split sleeve including a pair of substantially semi-circular sections having inturned edges with screw clamps having worm-like threads in combination with worm gear teeth for rigidly clamping said semi-circular sections over a break in a handle or over a splice.

Other features and advantages of the invention will appear from the following description taken in connection with the drawing, wherein:

Figure 1 is a perspective view illustrating the improved connector.

Figure 2 is a cross-section through the connector shown in Figure 1 taken on line 2—2 thereof with parts shown on an enlarged scale.

Figure 3 is a side elevational view of the improved clamping sleeve showing the sleeve used for splicing sections of a rod or the like.

Figure 4 is a plan view of one portion of the connector looking toward the inner surface of one of the semi-circular sleeves and showing a strap secured by rivets to the outer surface of the section of the sleeve.

Figure 5 is an end elevational view showing one of the semi-circular sections of the sleeve with a strap having a screw clamp thereon secured thereto.

Referring now to the drawing wherein like reference characters denote corresponding parts the improved broken handle or splice connector of this invention includes a pair of sections 10 and 11 substantially semi-circular in cross-section and a pair of clamps 12 and 13, each clamp including a strap 14 having worm gear teeth 15 therein secured by fasteners, such as rivet 16 to the outer surfaces of the sections 10 and 11 and a screw 17 having worm gear teeth 18 rotatably mounted in heads 19 and positioned whereby the teeth 18 thereof mesh with teeth 15 with ends of the straps extended through the heads as shown in Figure 2. One of the ends of the strap 14 is rolled and extended around a pin 20 by which the strap is secured in the head and as the screw is rotated in a clockwise direction with the strap positioned around the sections 10 and 11, as shown in Figure 2, the sections are clamped against a handle 21 and a section 22 thereof which, as illustrated in Figure 1, is broken from the handle 21 on the break line 23.

The screws 18 are rotatably mounted in bearings 24 in the head 19 of each clamp and as the screws are rotated free ends of the straps 14 are drawn through the heads rigidly clamping the sections 10 and 11 of the sleeve against the parts of the handles.

The section 10 is provided with inturned edges 25 and 26 and the section 11 is provided with similar edges 27 and 28 whereby with the sections 10 and 11 rigidly clamping the sections 21 and 22 of a handle the inturned edges are pressed into the material of the handle providing a rigid connection.

The sections 10 and 11 of the sleeve are preferably formed of metal, although it will be understood that the sections may be formed of other suitable materials.

It will be understood that modifications, within the scope of the appended claim, may be made in the design and arrangement of the parts without departing from the spirit of the invention.

What is claimed is:

In a connector for sections of a handle, the combination which comprises elongated strips of sheet material substantially semi-circular in cross-section having inturned edges positioned around the handle with ends of the strips of material overlapping adjoining ends of sections of the handle, straps mounted on the sections of the strips and having worm gear teeth therein positioned around said substantially semi-circular sections, heads pivotably mounted on ends of the straps, screws having worm threads thereon rotatably mounted in the heads and positioned in meshing relation with the worm gear teeth of the straps, and means securing one of the straps to one of said substantially semi-circular sections and the other of said straps to the other of said substantially semi-circular sections so that the edges of said sections are retained in spaced parallel relation to each other.

References Cited in the file of this patent

UNITED STATES PATENTS

| 468,293 | Coleman | Feb. 2, 1892 |
| 516,602 | Kershaw | Mar. 13, 1894 |
| 612,685 | Thorp et al. | Oct. 18, 1898 |
| 879,268 | Jamieson | Feb. 18, 1908 |
| 1,553,060 | Anderson | Sept. 8, 1925 |
| 2,268,211 | Hathorn | Dec. 30, 1941 |